United States Patent
Fofonoff et al.

(10) Patent No.: US 9,172,287 B2
(45) Date of Patent: Oct. 27, 2015

(54) ACTUATOR CONFIGURATION FOR A ROTARY DRIVE

(71) Applicant: Nucleus Scientific, Inc., Cambridge, MA (US)

(72) Inventors: Timothy A. Fofonoff, Cambridge, MA (US); Ian W. Hunter, Lincoln, MA (US)

(73) Assignee: NUCLEUS SCIENTIFIC, INC., Cambridge, MA (US)

( * ) Notice: Subject to any disclaimer, the term of this patent is extended or adjusted under 35 U.S.C. 154(b) by 218 days.

(21) Appl. No.: 13/827,212

(22) Filed: Mar. 14, 2013

(65) Prior Publication Data
US 2014/0265649 A1  Sep. 18, 2014

(51) Int. Cl.
*H02K 7/06* (2006.01)
*H02K 41/03* (2006.01)

(52) U.S. Cl.
CPC ............... *H02K 7/06* (2013.01); *H02K 41/031* (2013.01)

(58) Field of Classification Search
CPC ........ H02K 7/06; H02K 7/065; H02K 41/031
USPC ..................................................... 310/20, 80
See application file for complete search history.

(56) References Cited

U.S. PATENT DOCUMENTS

| | | | | |
|---|---|---|---|---|
| 4,300,067 | A * | 11/1981 | Schumann | 310/80 |
| 7,902,703 | B2 * | 3/2011 | Ucer | 310/80 |
| 2011/0108339 | A1 | 5/2011 | Hunter | |
| 2013/0002052 | A1 | 1/2013 | Hunter et al. | |

* cited by examiner

*Primary Examiner* — Hanh Nguyen
(74) *Attorney, Agent, or Firm* — Occhiuti & Rohlicek LLP

(57) ABSTRACT

A rotary drive includes: a support structure; and a linear actuator supported by the support structure. The linear actuator includes: a first member; a second member that moves in a linear direction relative to the first member when a drive signal is applied to the linear actuator; and a bearing arrangement supporting the first and second members within the support structure and enabling independent movement of the first member and the second member relative to the support structure. The rotary drive also includes a linear-to-rotary converter to which the second member of the linear actuator is coupled. The linear-to-rotary converter includes an output member having a rotational axis. During operation, the linear-to-rotary converter converts linear reciprocating movement of the second member of the linear actuator to rotary movement of the output member about the rotational axis.

19 Claims, 11 Drawing Sheets

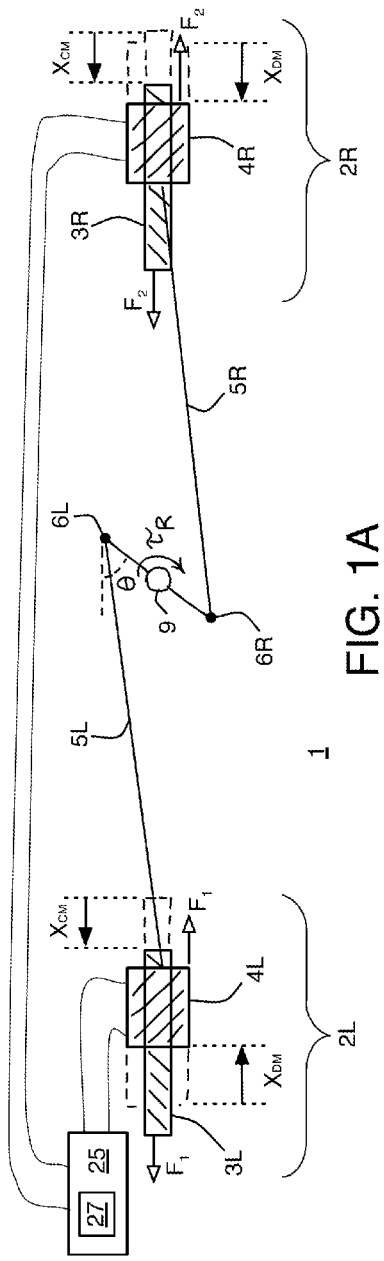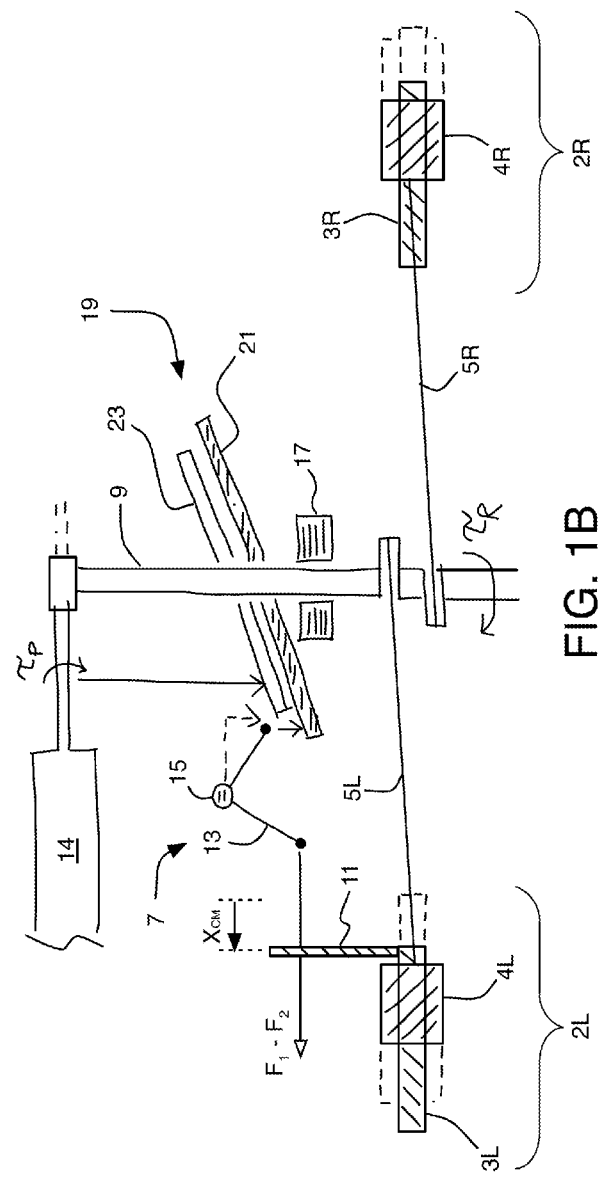
FIG. 1A
FIG. 1B

ACTUATOR CONFIGURATION FOR A ROTARY DRIVE

STATEMENT AS TO FEDERALLY SPONSORED RESEARCH

This invention was made with government support under Contract No. FA8650-11-M-3146 awarded by the United States Air force (USAF). The government has certain rights in the invention.

BACKGROUND

There is a class of electric motors that produce rotary motion from linear motion. They do this by using a linear-to-rotary converter, one example of which is a cam. One such type of motor is described in U.S. Patent Pub. No. 2011/0108339. The embodiments described herein are other examples of such motors.

SUMMARY

In one aspect, in general, a rotary drive includes: a support structure; and a linear actuator supported by the support structure. The linear actuator includes: a first member; a second member that moves in a linear direction relative to the first member when a drive signal is applied to the linear actuator; and a bearing arrangement supporting the first and second members within the support structure and enabling independent movement of the first member and the second member relative to the support structure. The rotary drive also includes a linear-to-rotary converter to which the second member of the linear actuator is coupled. The linear-to-rotary converter includes an output member having a rotational axis. During operation, the linear-to-rotary converter converts linear reciprocating movement of the second member of the linear actuator to rotary movement of the output member about the rotational axis.

Aspects can include one or more of the following features.

The first member is a magnetic stator assembly including one or more magnets generating magnetic fields, and wherein the second member is a coil assembly including a coil arranged to reciprocate within the magnetic fields generated by the magnetic stator assembly.

The rotary drive further includes: a second support structure rigidly connected to the first-mentioned support structure; and a second linear actuator supported by the second support structure. The second linear actuator includes: a first member; a second member that moves in a linear direction relative to the first member of the second linear actuator when a drive signal is applied to the second linear actuator; and a second bearing arrangement supporting the first and second members of the second linear actuator within the second support structure and enabling independent movement of the first and second members of the second linear actuator relative to the second support structure. The second member of the second linear actuator is coupled to the linear-to-rotary converter and wherein during operation, the linear-to-rotary converter converts linear reciprocating movement of the second member of the second linear actuator to rotary movement of the output member about the rotational axis. The first member of the first-mentioned linear actuator is rigidly connected to the first member of the second linear actuator so that the first member of the first-mentioned linear actuator and the first member of the second linear actuator move together.

The first-mentioned bearing arrangement includes: a first bearing assembly providing bearing surfaces between the first member of the first-mentioned linear actuator and the second member of the first-mentioned linear actuator and enabling movement of the first member of the first-mentioned linear actuator relative to the second member of the first-mentioned linear actuator; and a second bearing assembly providing bearing surfaces between the first member of the first-mentioned linear actuator and the first-mentioned support structure and enabling movement of the first member of the first-mentioned linear actuator relative to the first-mentioned support structure.

The second bearing arrangement includes: a first bearing assembly providing bearing surfaces between the first member of the second linear actuator and the second member of the second linear actuator and enabling movement of the first member of the second linear actuator relative to the second member of the second linear actuator; and a second bearing assembly providing bearing surfaces between the first member of the second linear actuator and the second support structure and enabling movement of the first member of the second linear actuator relative to the second support structure.

The first member of the first-mentioned linear actuator is a magnetic stator assembly includes one or more magnets generating magnetic fields, and the second member of the first-mentioned linear actuator is a coil assembly including a coil arranged to reciprocate within the magnetic fields generated by the magnetic stator assembly of the first-mentioned linear actuator.

The first member of the second linear actuator is a magnetic stator assembly including one or more magnets generating magnetic fields, and the second member of the second linear actuator is a coil assembly including a coil arranged to reciprocate within the magnetic fields generated by the magnetic stator assembly of the second linear actuator.

The linear-to-rotary converter is configured to constrain motion of the second member of the first-mentioned linear actuator relative to the second member of the second linear actuator to be symmetric with respect to each other about a plane that is fixed with respect to the first and second support structures.

The plane is perpendicular to the linear direction in which the second member of the first-mentioned linear actuator moves, and perpendicular to the linear direction in which the second member of the second linear actuator.

The plane contains the rotational axis.

The rotary drive further includes: a control interface configured to receive a drive signal for the first-mentioned linear actuator and a drive signal for the second linear actuator, where differential mode drive signals applied to the linear actuators corresponds to reciprocating movement of the second member of the first-mentioned linear actuator and the second member of the second linear actuator, and common mode drive signals applied to the linear actuators corresponds to motion of the first member of the first-mentioned linear actuator and the first member of the second linear actuator relative to the first and second support structures.

The output member comprises a rotor drive shaft.

The rotary drive further includes a swashplate surrounding the rotary drive shaft.

The rotary drive further includes a control arm operated by movement of the first member of the linear actuator relative to the support structure.

The control arm is mechanically coupled to the support structure, and is configured to convert linear motion of the first member relative to the support structure into tilting of the swashplate.

The rotary drive further includes rotor blades coupled to the rotor drive shaft, with the control arm configured to control cyclic pitches of the rotor blades.

Aspects can have one or more of the following advantages. Some electric motors include a rotating portion (called a "rotor") that rotates in response to an electromagnetic force on one or more coils that move relative to a stationary portion (called a "stator") that generates a magnetic field. When a coil, located within a portion of the generated magnetic field, carries an applied current, there is a force on the coil (i.e., the Lorentz force on electric charges moving in a magnetic field). In an implementation of a rotary drive subassembly described herein, instead of a stationary magnetic stator, there is a magnetic stator assembly that is itself configured to move due to a Lorentz force on two coils whose movement is partially constrained, as described in more detail below. The coils are constrained such that applied currents that correspond to symmetric forces on the coils rotate a rotor, and applied currents that correspond to asymmetric forces on the coils translate the assembly. These two independent degrees of freedom enable a controller to efficiently control a rotary drive by application of current to the coils, as described in more detail below. The rotary drive can be used to rotate blades that provide thrust for a helicopter, for example. Additionally, the combination of multiple rotary drive subassemblies in a rotary drive, and the combination of multiple rotary drives (e.g., two rotary drives with opposing sets of blades that rotate about a common axis but in opposite directions), enables one to construct a modular thruster, e.g. as for an aerial vehicle. In particular, this combination enables the force generated by the thruster to be subdivided into identical, manageable sets of actuators that can be quickly and independently controlled.

Other features and advantages of the invention are apparent from the following description, and from the claims.

DESCRIPTION OF DRAWINGS

FIG. 1A is a schematic diagram of a rotary drive subassembly with two linear actuators, coupled to a rotor drive shaft.

FIG. 1B is a schematic diagram of the rotary drive subassembly, coupled to the rotary drive shaft, with rotor blade control.

DESCRIPTION

Figure 1C:
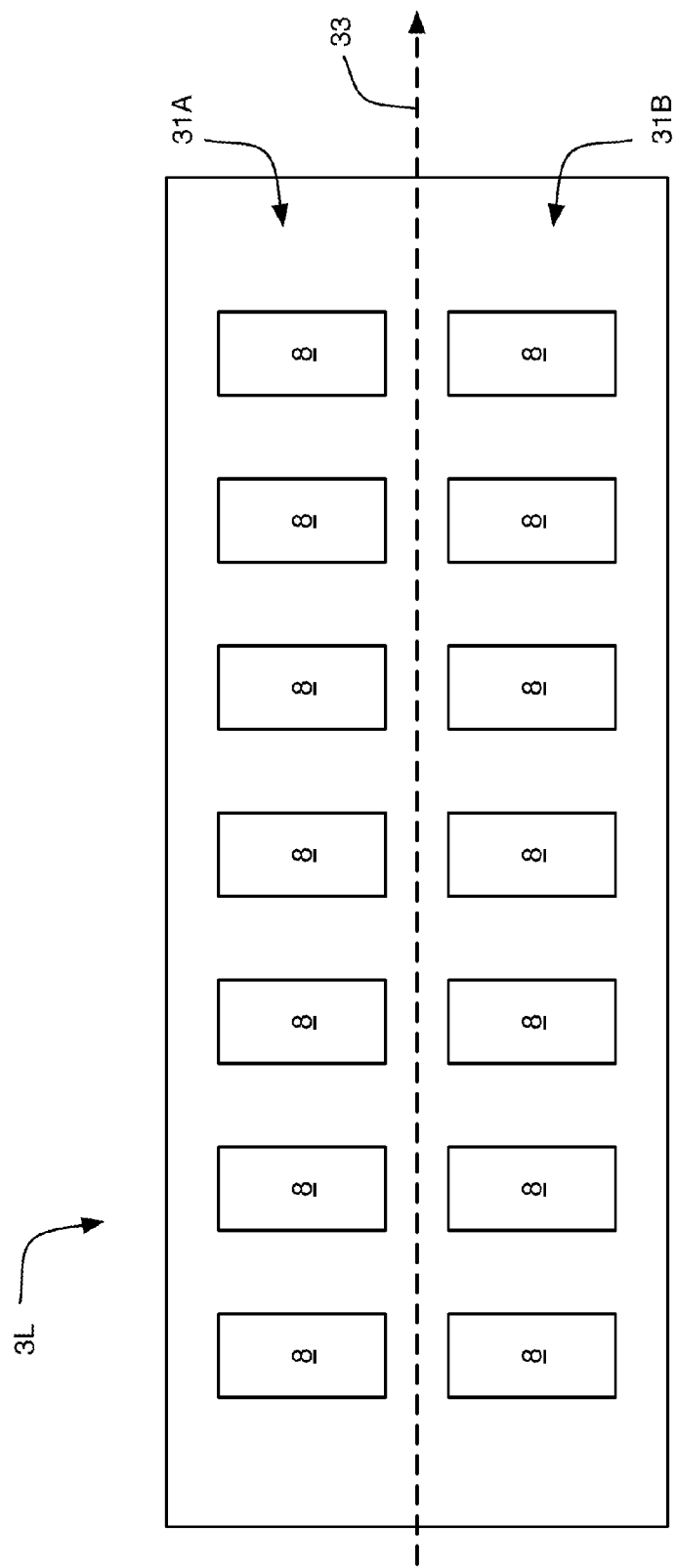
FIG. 1C is a schematic diagram of an arrangement of magnets in a magnetic stator assembly.
Figure 2:
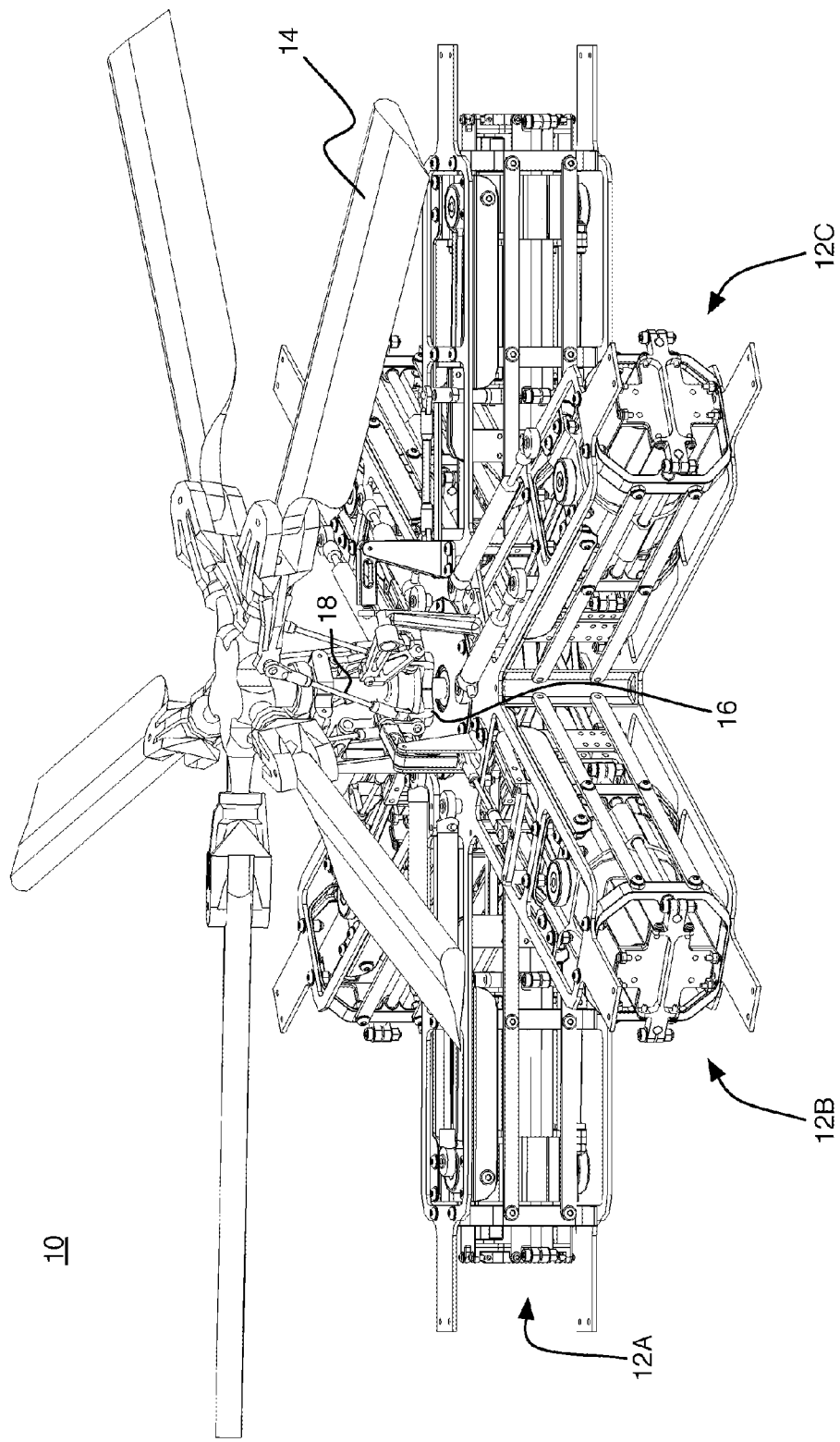
FIG. 2 is a view of a rotary drive.

The embodiment described herein is a rotary drive for a helicopter as shown in FIG. 2. Before going into the details of that drive, however, an overview of the basic features will first be presented with the aid of the schematic representations shown in FIGS. 1A and 1B.

In its most general form, the rotary drive includes at least one subassembly that includes two linear actuators and a linear-to-rotary converter that converts linear movement produced by the linear actuators to rotary movement about a rotational axis. The two linear actuators are physically opposed to each other relative to the rotational axis. In the described embodiment, each linear actuator is an electromagnetic linear actuator that has two basic components, namely, a magnetic stator assembly including permanent magnets, which generate magnetic fields that are roughly perpendicular to the axis of the actuator, and a coil assembly including a coil surrounding the magnetic stator assembly and the permanent magnets with its windings intersecting the magnetic fields produced by the magnets. The rotary drive subassembly also includes bearing assemblies that constrain the linear movement of the coils relative to their respective magnetic stator assemblies, and that constrain the movement of the magnetic stator assemblies relative to a support structure of the rotary drive, as described in more detail below.

FIGS. 1A and 1B show a top view and a side view, respectively, of a rotary drive subassembly 1, which has two degrees of freedom, one degree of freedom corresponding to rotation of rotor blades 14 of a rotary drive 10 (FIG. 2), and another degree of freedom corresponding to movement of a control arm 7 for controlling the cyclic pitches of the rotor blades 14. Referring to FIG. 1A, the rotary drive subassembly 1 includes two linear actuators 2L and 2R, one on the left (2L) and the other on the right (2R), a left end magnetic stator assembly 3L and a right end magnetic stator assembly 3R, which are rigidly coupled together within the rotary drive subassembly so that they are constrained to move together. Each magnetic stator assembly 3L and 3R includes a set of permanent magnets 8 (FIG. 1C) arranged to provide a magnetic field that powers movement of its respective coil 4L and 4R, as described in more detail below. The left end coil 4L moves relative to a magnetic field generated by the left end magnetic stator assembly 3L, and the right end coil 4R moves relative to a magnetic field generated by the right end magnetic stator assembly 3R.

The Lorentz force that results from application of current to a coil in a magnetic field powers movement of each coil. One way to express the Lorentz force is as a force $F_1$ on the coil 4L to the right, and an equal and opposite force on the magnetic stator assembly 3L to the left, in response to a first current $i_1$ supplied to the coil 4L. Likewise, there is a force $F_2$ on the coil 4R to the left, and an equal and opposite force on the magnetic stator assembly 3R to the right, in response to a second current $i_2$ supplied to the coil 4R. The net force on the coupled magnetic stator assemblies from the forces on each magnetic stator assembly is $F_1-F_2$, resulting in a "common mode" displacement of $X_{CM}$ for the coupled magnetic stator assemblies. An arm 5L mechanically coupled to the coil 4L and an attachment point 6L on a crank, and an arm 5R mechanically coupled to the coil 4R and an attachment point 6R on the crank, when pushed inward by their respective coils, apply a torque $\tau_R$ to the crank (or other linear-to-rotary converter) that rotates a rotor drive shaft 9. The crank and the arms also constrain movement of the coils 4L and 4R to be symmetric with respect to each other relative to a plane through the center of the rotor drive shaft 9, such that a "differential mode" displacement of $XD_{DM}$ of the coil 4L to the right corresponds to the same displacement $X_{DM}$ of the coil 4R to the left.

Referring to FIG. 1B, in a side view, movement of the magnetic stator assembly 3L moves the control arm 7 that tilts a swashplate 19 to control the pitch of the rotor blade 14. The swashplate 19 includes a non-rotating disk 21 on the bottom and a rotating disk 23 on the top, which are both concentric with the rotor drive shaft 9. A set of bearings between the two discs allows the rotating disk 23 to rotate, while the stationary disk 21 is able to tilt but does not rotate. Both disks 21 and 23 are also able to slide up and down the rotor drive shaft 9 in response to movement of multiple control arms. The control arms 7 also tilt the swashplate 19 into to a desired orientation in response to control inputs (e.g., based on a pilot's controls). A minimum of three control arms is used to position the swashplate 19 relative to the rotor drive shaft 9.

Figure 3:
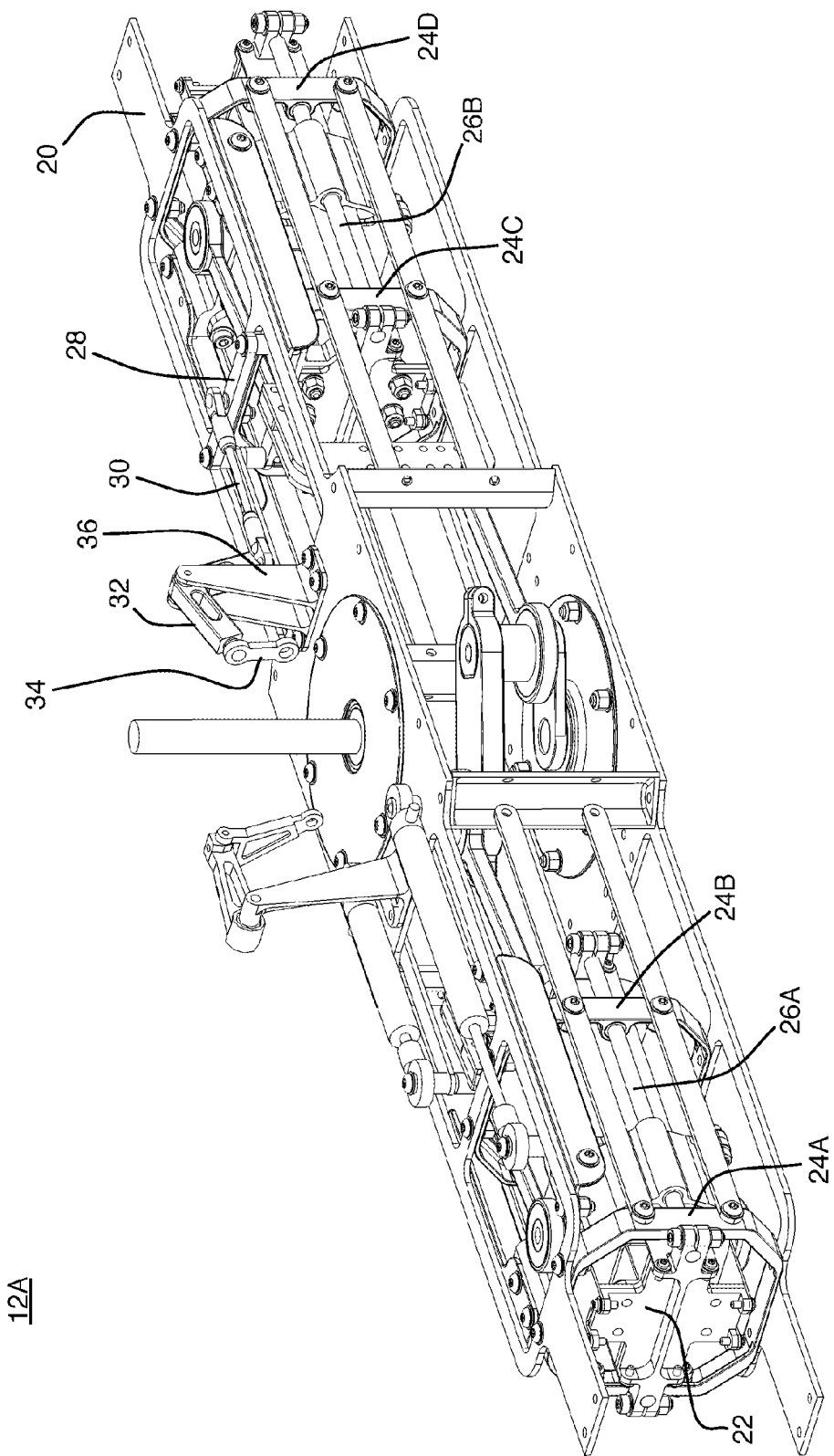
FIGS. 3 and 4 are views of a rotary drive subassembly (with some elements removed for clarity).

A bar 11 attached to the magnetic stator assembly moves with the magnetic stator assembly 3L to translate a lower portion of the control arm 7, which rotates an angle bracket 13 about a pivot point 15 attached to a support structure 20 (see FIG. 3). The support structure 20 also includes a rotational bearing 17 within which the rotor drive shaft 9 rotates. When the angle bracket 13 pivots down (up) due to movement of the magnetic stator assembly to the left (right), it tilts the non-rotating disk 19 of the swashplate downward (upward). Lugs (one for each rotor blade) mechanically couple the rotating disk 21 of the swashplate to a rotor blade 23 to apply a torque $\tau_P$ that changes the pitch of the rotor blade 23. Vertical movement of the entire swashplate causes a collective pitch change in the blades, which either increases or decreases the thrust of the rotary drive. Tilting of the swashplate causes the rotor blades to flap during rotation, which tilts the thrust vector.

The elements of FIGS. 1A and 1B are patterned to indicate how different elements move relative to each other during operation. Unfilled elements rotate with the rotor blades. Elements filled with diagonal lines at 45 degrees move together as part of the magnetic stator assembly. Elements filled with diagonal lines at −45 degrees (the coils 4L and 4R) move symmetrically with respect to each other, and in synchronization with rotation of the rotor drive shaft 9.

A controller 25 is configured to control current $i_1$ supplied by a current supply 27 to the coil 4L of the left actuator 2L, and current $i_2$ supplied by the current supply 27 to the coil 4R of the right actuator 2R, in order to select desired values of the common mode displacement $X_{CM}$ and the differential mode displacement $X_{DM}$, which are determined, respectively, by the resulting common mode force $F_{CM}=F_1-F_2$ and differential mode force $F_{DM}=F_1+F_2$. The Lorentz forces are proportional to the currents as follows:

$$F_1 = \kappa i_1$$

$$F_2 = \kappa i_2$$

where κ is a function of a coil position (e.g., larger at a center position and smaller away from the center). Therefore, the currents expressed in terms of the desired common mode and differential mode forces are as follows.

$$i_1 = (F_{DM} + F_{SM})/(2\kappa)$$

$$i_2 = (F_{DM} - F_{SM})/(2\kappa)$$

Referring to FIG. 2, an example of a rotary drive 10 includes an arrangement of three rotary drive subassemblies 12A, 12B, and 12C configured to drive a rotor blade assembly that has five rotor blades 14. The rotary drive subassemblies together provide a torque that rotates the rotor blades 14 about a central axis. The rotary drive 10 includes a swashplate 16 that sets the cyclic and collective pitches of the rotor blades 14 by movement of separate rods 18 connecting each rotor blade 14 to a different location on the swashplate 16. Each rotary drive subassembly includes two coil assemblies that convert electromagnetic energy provided by the controller 25 into linear motion of the coil assemblies. A crank (not visible in this figure) then converts that linear motion of the coil assemblies into rotary motion of the rotor blades, as described in more detail below. Each rotary drive subassembly also has an additional mechanical degree of freedom, described in more detail below, that through a control arm assembly (elements 30, 32, 34, 36 of FIG. 3) serves to control the vertical position of a corresponding connection point on the swashplate 16. The linear motion of the coil assemblies is controlled by a first signal provided by the controller 25 to a control interface (e.g., wires from each of the coil assemblies). The vertical motion of the control arms is controlled by a second signal provided by the controller 25 to the control interface. The FIGS. 3, 4, 5A-5C, and 6A-6C show, in more detail, different aspects of the functionality of the rotary drive subassembly 12A.

Referring to FIG. 3, a support structure 20 that includes multiple sections assembled into a mechanically rigid frame supports two bearing assemblies, each of which supports the magnetic stator assembly and the coil assembly of a corresponding linear actuator within the support structure. Each bearing assembly enables both the magnetic stator assembly and the coil assembly to move independent of each other within the support structure. Additionally, the two magnetic stator assemblies are rigidly connected to each other such that they move together as part of a magnetic stator unit 22. The two bearing assemblies include bearing surfaces that together form another bearing assembly that enable movement of the magnetic stator unit 22 relative to the support structure.

Figure 4:
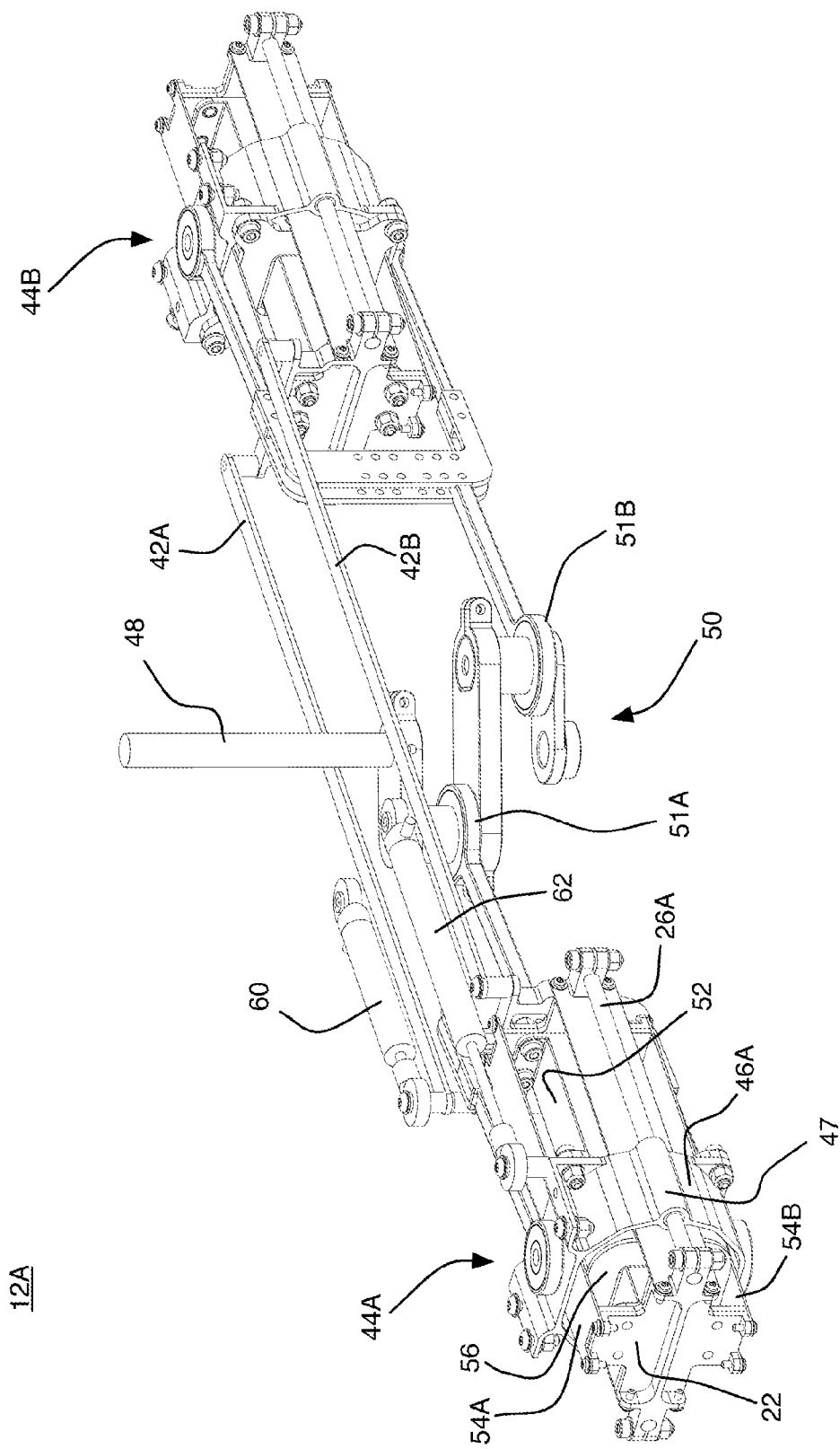

While FIG. 3 shows the support structure 20, which includes sections of the frame associated with the rotary drive subassembly 12A, the entire support structure includes additional sections associated with the other two rotary drive subassemblies 12B, and 12C, as well. As will be described in greater detail below, these three sections and their linear actuators operate to rotate a rotor drive shaft 48 using a crank 50 that has two crank throws 51A and 51B (FIG. 4). In other words, in this embodiment, the crank 50 functions as a linear-to-rotary converter which converts the linear movement generated by the linear actuators to rotary movement of the rotor drive shaft 48.

Each bearing assembly includes four cylindrical slide bearings, only two of which are visible in FIG. 3 for each bearing assembly (bearings 24A and 24B for the left bearing assembly, and bearings 24C and 24D for the right bearing assembly), the other two being hidden by the structure. These slide bearings provide bearing surfaces between different sections of the support structure 20 and the magnetic stator assemblies of the respective linear actuators (a first support structure section for one linear actuator, and a second support structure section, rigidly connected to the first support structure section, for the other linear actuator). Each bearing assembly also includes two slide rods, only one of which is visible in FIG. 3 for each bearing assembly (slide rod 26A for the left bearing assembly and slide rod 26B for the right bearing assembly), that are connected to the corresponding magnetic stator assembly and that slide along a corresponding pair of the cylindrical slide bearings. In the left bearing assembly shown in FIG. 3, this includes the slide rod 26A that slides along the slide bearings 24A and 24B, and in the right bearing assembly shown in FIG. 3, this includes the slide rod 26B that slides along the slide bearings 24C and 24D. Identical slide rods are included on the backside and thus are not visible in FIG. 3

The magnetic stator unit 22 also includes a bar 28 that protrudes through a rectangular opening in the top of the support structure 20. The bar 28 is attached to the magnetic stator assembly of one of the two linear actuators. Attached to the bar 28 is a control arm assembly that includes three moving parts coupled together at respective joints: a translation rod 30 connected to the bar 28, an angle bracket 32 connected to the support structure 20 through a brace 36, and a swivel connector 34 for coupling one end of the angle bracket 32 to a corresponding lug on the swashplate 16 (not shown in FIG. 3). As the magnetic stator unit 22 moves within the support structure 20 along the bearings of the two bearing assemblies, it moves the translation rod 30 horizontally. The angle bracket 32, to which the translation rod 30 is connected, converts the horizontal movement of the translation rod 30 to vertical movement of the other end of the angle bracket 32. This, in turn, controls the height and/or orientation of the swashplate 16. The movement of the magnetic stator unit 22 is illustrated and described in more detail below (with reference to FIGS. 6A-6C), along with a description of the powering of the movement by the controller 25.

Figure 5A:
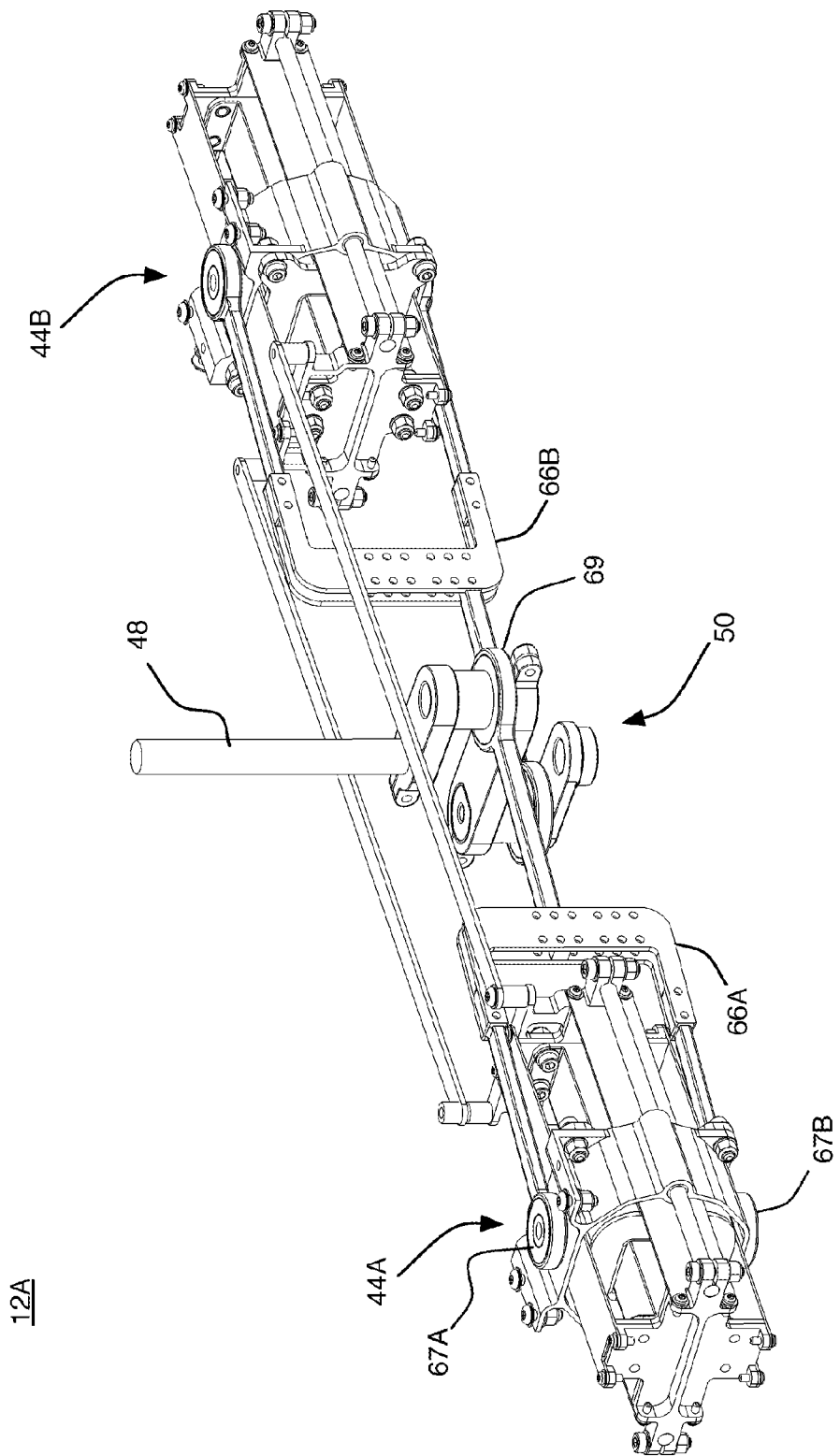
FIGS. 5A-5C are views of portions of the rotary drive subassembly illustrating how the linear movement of the coil assemblies produces rotary movement of the rotor shaft.

Referring to FIG. 4, the rotary drive subassembly 12A is shown with elements of the support structure 20 removed to more clearly expose certain components within that support structure 20. The magnetic stator assemblies of the two linear actuators are rigidly connected to each other by arms 42A and 42B to form the magnetic stator unit 22. Thus, the two magnetic stator assemblies are constrained to move together along their respective support bearings. Each coil assembly 44A and 44B includes a coil within a coil housing 56 supported within an outer bracket 46A. The bracket 46A, in turn, has two linear motion bearings, which are arranged to slide along the slide rods (linear motion bearing 47 that slides along the slide rod 26A, and another linear motion bearing that slides along the slide rod on the back-side not visible in FIG. 4). These linear motion bearings provide bearing surfaces between the coil assemblies and the magnetic stator assemblies. Thus, by virtue of this arrangement of these bearings, the coil assembly 44A is able to move back and forth within the support structure 20 and independent of its magnetic stator assembly. Each coil assembly is connected to a corresponding throw of the crank 50 by a corresponding coupling arm 66A and 66B (FIG. 5A). One end of each the coupling arm couples via rotary bearings 67A and 67B (FIG. 5A) to its corresponding coil assembly 44A at two points on opposite sides of the coil assembly. The other end of each coupling arm is connected to a corresponding one of the two throws of the crank 50 through another rotary bearing 69 (FIG. 5A). Since the two throws of the crankshaft are 180° out of phase with each other, the two coil assemblies are constrained to move in opposite directions to each other (i.e., symmetrically) as the crank 50 turns, as will be described in more detail below (with reference to FIGS. 5A-5C).

The movement of each linear actuator is powered by the Lorentz force that results from applying a current to a coil in a magnetic field. Each linear actuator includes a magnetic stator assembly including: a magnet housing 52 that houses one or more permanent magnets (not visible in the figure), and metal plates 54A and 54B above and below the magnet housing 52 that provide return paths for the magnetic flux produced by the magnets in the magnet housing 52 (e.g., plates that consist essentially of a metal with a relatively high magnetic permeability). Referring again to FIG. 1C, one example of an arrangement of the permanent magnets 8 within the magnet housing 52 uses two opposed rows (31A and 31B) of magnets 8 with the magnetic moments of the magnets within each row directed in the same direction transverse to an axis 33 of the magnet housing 52 (along which the coil moves), and with the magnetic moments of the magnets 8 in row 31A in the opposite direction to the magnetic moments of the magnets 8 in row 31B. A detailed example of such an arrangement is described in more detail in U.S. Pat. Pub. 2011/0108339, entitled Electric Motor, and incorporated herein by reference. Another example of an arrangement of the permanent magnets uses a single row of magnets with the magnetic moments alternating in opposite directions between neighboring magnets, and parallel to the axis of the magnet housing 52. A detailed example of such an arrangement is described in more detail in U.S. Pat. Pub. 2013/0002052, entitled Magnetic Stator Assembly, and incorporated herein by reference.

Each linear actuator also includes a coil assembly 44A, which includes the coil housing 56 connected to the circular bracket 46A. The coil housing 56 houses a coil of windings made of a conductive material (e.g., copper) surrounding the magnet housing 52 and the permanent magnets housed therein. Thus, the coil windings are continuously subjected to the magnetic fields that are generated by the permanent magnets. The permanent magnets within the magnet housing 52 are arranged (in both of the arrangements described above) to produce a magnetic field that is transverse to the axis of the magnet housing 52 and substantially perpendicular to the windings of the coil. When a current is applied to the coil, a Lorentz force is generated which urges to the coil to move along the magnet housing with the direction and force depending on the sign and magnitude of the applied current.

The rotary drive subassembly 12A also includes position sensors that are used for passive monitoring and/or active feedback control by the controller 25. A stator position sensor 60, which is connected between the magnetic stator assembly and the support structure, senses the position of the magnetic stator unit 22 relative to the support structure 20, and a coil position sensor 62, which is connected between the coil assembly 44A and the support structure 20, senses the position of the coil assembly 44A relative to the support structure 20. The controller 25 monitors the signals from these sensors so as to determine the position of the magnetic stator unit 22 (and thus the position of both magnetic stator assemblies), and the positions of the coil assemblies 44A and 44B.

The controller 25 includes a current supply 27 that supplies current to the coils of both coil assemblies 44A and 44B. Control signals from the controller 25 determine the specific value (i.e., magnitude and direction) of the current $i_A$ supplied to the coil of coil assembly 44A, and the specific value of the current $i_B$ supplied to the coil of coil assembly 44B. The control signals may be determined, for example, by a control program executing on one or more processors in the controller 25, or by control logic programmed into a printed circuit board of the controller 25. The direction in which a coil assembly 44A moves in response to a supplied current $i_A$ is determined by parameters that include: the polarity of the magnets in the magnet housing 52, the direction of the windings of the coil in the coil housing 56, and the direction of the supplied current (indicated by the sign of $i_A$). In this example, the parameters for the coil assemblies 44A and 44B are selected such that substantially equal values of the currents $i_A$ and $i_B$ (i.e., approximately equal magnitudes and identical signs) correspond to symmetric movement of the coil assemblies 44A and 44B.

Figure 5B:
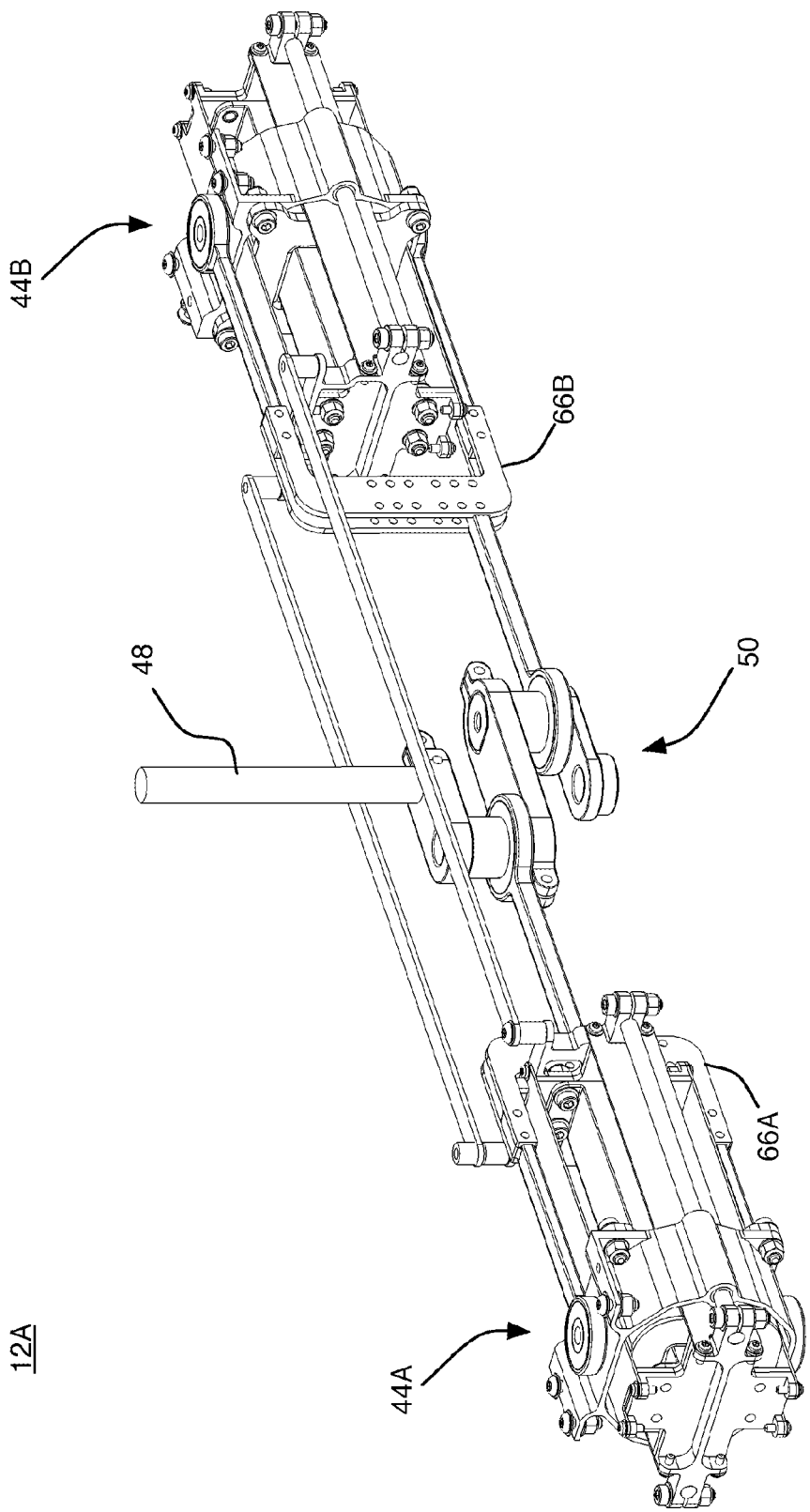
Figure 5C:
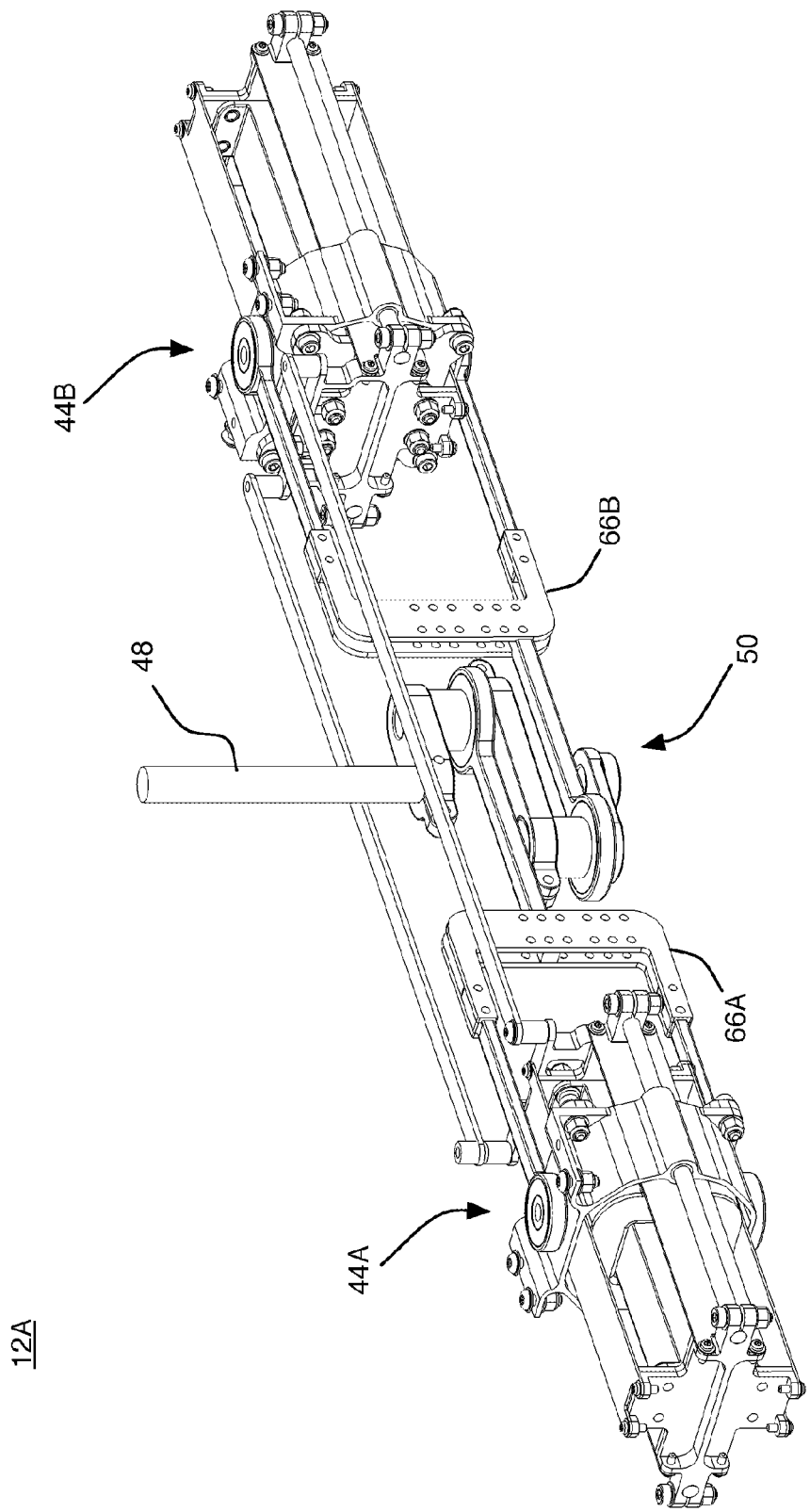

FIGS. 5A-5C illustrate how symmetrical movement of the coils causes rotation of the crank 50 and the rotor drive shaft 48. They show three different symmetric positions of the coil assemblies 44A and 44B which occur during operation of the rotary drive subassembly 12A. FIG. 5A shows a position in which the coil assemblies 44A and 44B are each at a midpoint in a span of their movement during operation, with the crank 50 at a first angle (0°) determined by corresponding positions of respective arms 66A and 66B connecting the assemblies 44A and 44B to the crank 50. FIG. 5B shows a position in which the coil assemblies 44A and 44B are at maximally separated endpoints in the spans of their movement, with the crank 50 at a second angle (90°) determined by corresponding positions of the arms 66A and 66B. FIG. 5C shows a position in which the coil assemblies 44A and 44B are at minimally separated endpoints in the spans of their movement, with the crank 50 at a third angle (270°) determined by corresponding positions of the arms 66A and 66B. Other symmetric positions of the coil assemblies and other corresponding angles of the crank 50 would occur at other instances, as the appropriate currents $i_A$ and $i_B$ are provided to move the coils back and forth and turn the crank 50 and rotor drive shaft 48 through 360.

Figure 6A:
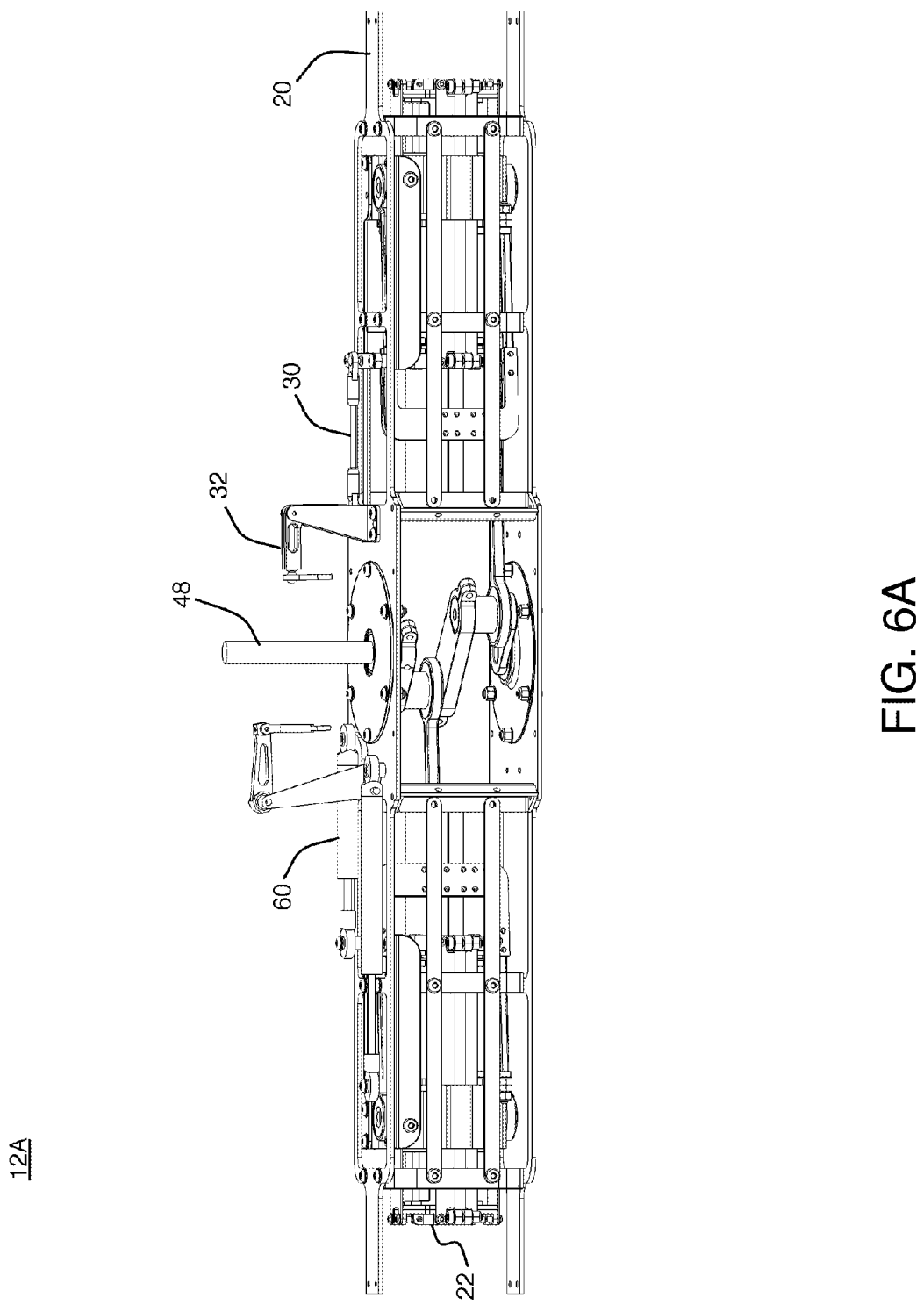
FIGS. 6A-6C are views of portions of the rotary drive subassembly illustrating how the linear movement of the magnetic stator assemblies produces the movement of the control arm for a swashplate.
Figure 6B:
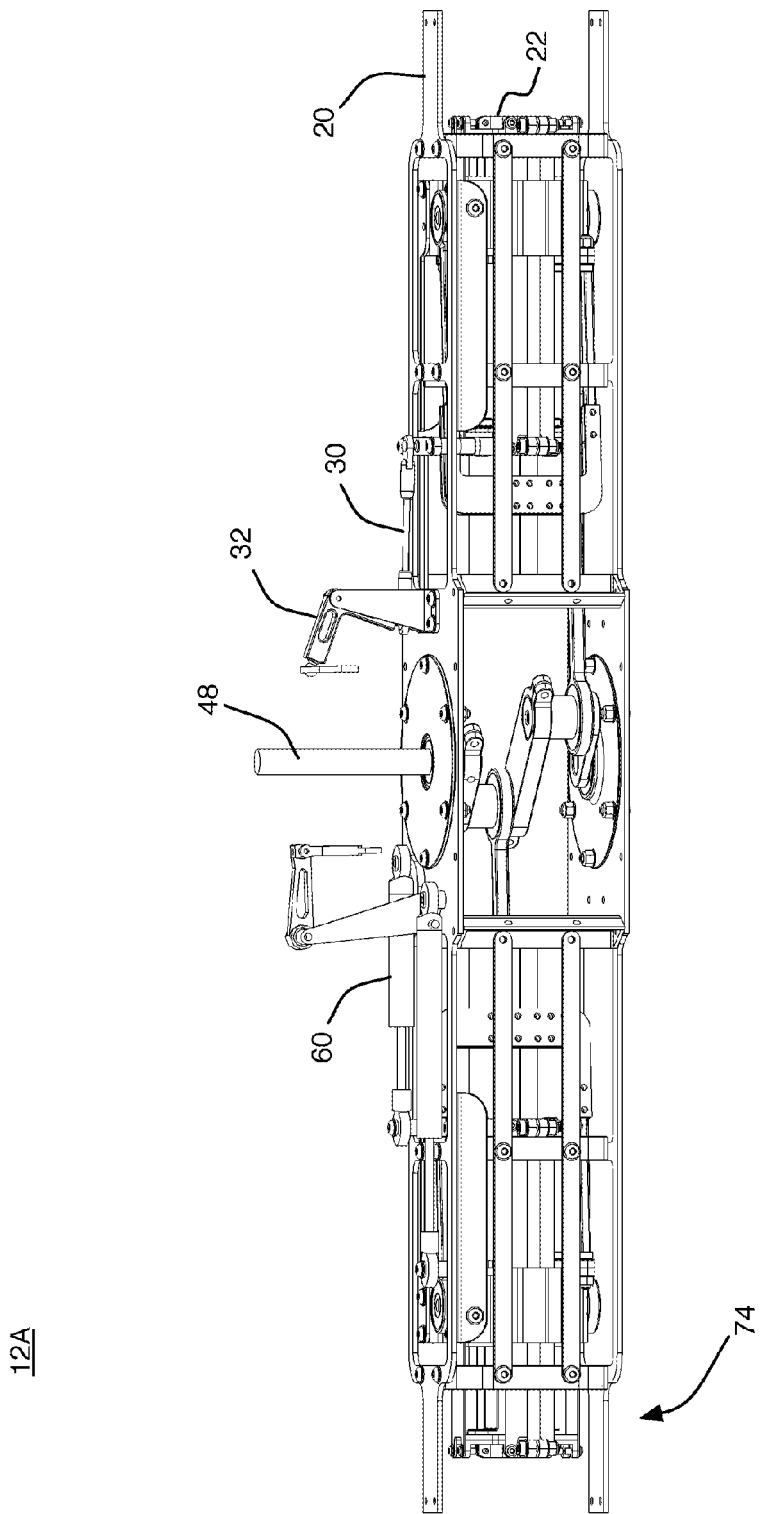
Figure 6C:
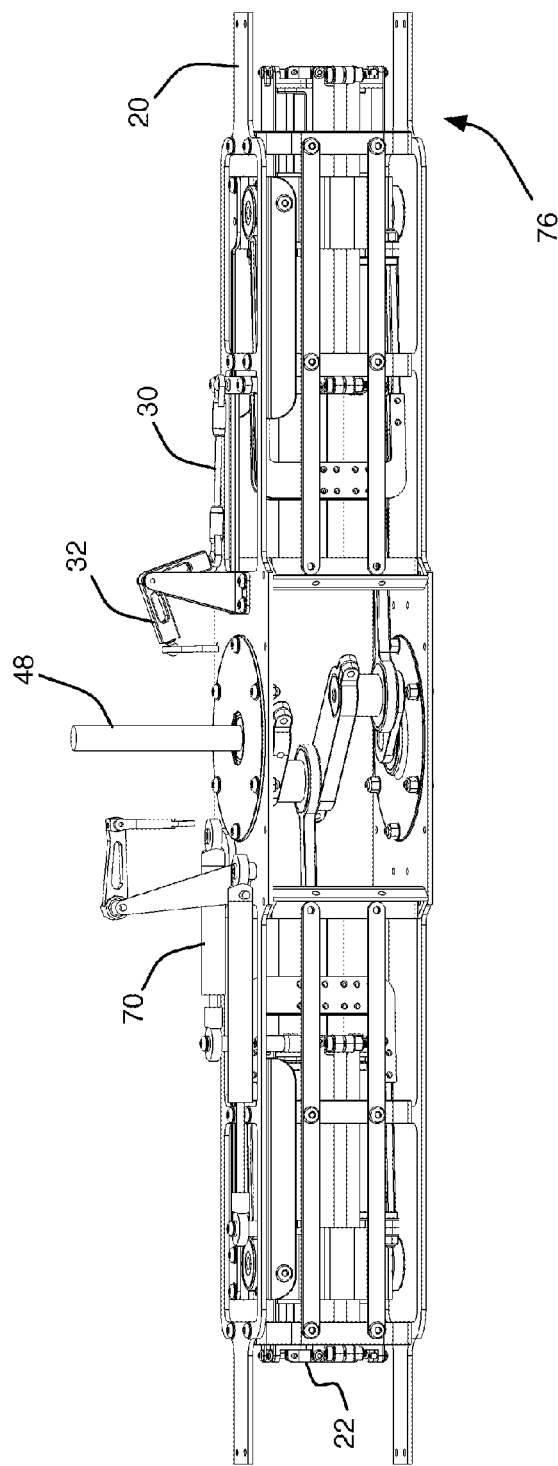

FIGS. 6A-6C illustrate how movement of the magnetic stator unit 22 (which is the coupled magnetic stator assemblies) controls the position of the control arm assembly (translation rod 30, angle bracket 32, and swivel connector 34). They show three different positions of the magnetic stator unit 22 which occur during operation of the rotary drive subassembly 12A. FIG. 6A shows a position in which the magnetic stator unit 22 is at a midpoint in a span of its movement during operation, with the translation rod 30 at a location such that the angle bracket 32 is level. In this position, the magnetic stator unit 22 is centered with respect to the support structure 20, which is sensed by the drive position sensor 60. FIG. 6B shows a position in which the magnetic stator unit 22 is at an extreme position in a span of its movement during operation, with the translation rod 30 at a location such that the angle bracket 32 is raised. In this position, magnetic stator unit 22 is translated toward a left side 74 of the support structure 20, which is sensed by the drive position sensor 60. FIG. 6C shows a position in which the magnetic stator unit 22 is at another extreme position in a span of its movement during operation, with the translation rod 30 at a location such that the angle bracket 32 is lowered. In this position, the magnetic stator unit 22 is translated toward a right side 76 of the support structure 20, which is sensed by the drive position sensor 60.

This linear movement of the magnetic stator unit 22 to the left or right positions to raise or lower the angle bracket 32 (and thereby tilt the swashplate 16) is controlled by control signals from the controller 25 that determine the currents $i_A$ and $i_B$ supplied to the coil assemblies 44A and 44B. Since the motion of the coil assemblies 44A and 44B is constrained by the crank 50 to be symmetric with respect to each other about a plane through the rotor drive shaft 48, to the extent that the currents $i_A$ and $i_B$ do not have substantially opposite values, the resulting Lorenz forces between the coil assemblies and the magnetic stator unit 22 generate a net force that translates the magnetic stator unit 22 relative to the support structure 20. For example, substantially opposite values of the currents $i_A$ and $i_B$ (i.e., current signals having opposite signs and approximately equal magnitudes) would produce "common mode" movement of the magnetic stator unit 22 without movement of the coil assemblies 44A and 44B. Also, substantially identical values of the currents $i_A$ and $i_B$ (i.e., current signals having the same signs and approximately equal magnitudes) would produce symmetric "differential mode" movement of the coil assemblies 44A and 44B without movement of the magnetic stator unit 22.

In practice, a superposition of common mode and differential mode current signals yields summed common mode and differential mode current components that total to individual values of the currents $i_A$ and $i_B$ that enable independent control of: (1) rotation of the rotor drive shaft 48 by rotation of the crank 50, and (2) tilting of the swashplate 16 by movement of the control arm. Together, tilting of the swashplate 16 at three different connection points by the three different rotary drive subassemblies 12A, 12B, and 12C enables full control of the orientation of the swashplate 16. The controller 25 can be configured to use two active control loops for each rotary drive subassembly, including one control loop that outputs differential mode current components with feedback from the coil position sensor 62 to control rotor blade assembly rotation, and another control loop that outputs common mode current components with feedback from the drive position sensor 60 to control the swashplate tilt and resulting cyclic pitch of the rotor blades. This independent control of rotation of the rotor blades and cyclic pitch of the rotor blades, based on the supplied currents, enables a compact and efficient rotary drive 10.

The rotary drive 10 can be used in a variety of other vehicles in addition to helicopters and in components of other aircraft, including, for example, in a thruster. A thruster that uses one or more rotary drives powered by the rotary drive subassemblies described herein are able to provide the necessary amount of thrust and control for an aerial vehicle to accomplish vertical takeoff and landing procedures with an acceptable system mass and volume. For example, an aircraft can incorporate a single thruster at the center of an airframe. Because at very low speeds conventional airframe control surfaces have little effect, the thruster can be configured to provide stability at takeoff and landing. In particular, in addition to providing vertical thrust, the thruster is capable of balancing the aircraft's torque (yaw) and creating significant moments in pitch and roll using the rotor blade angle control mechanism. The rotor blade angle control mechanism can be configured as cyclic pitch controlled rotors, as used in modern helicopters, where moments are imposed on the aircraft via cyclically-controlled pitch angles of the rotor blades as they travel about a central axis. The thruster can include two rotary drives with opposing sets of rotor blades that rotate around a common axis in opposite directions. This provides a compact, distributed, and symmetric thruster, with minimal occlusion of flow through the thruster.

Though one type of linear actuator was described in connection with the embodiment presented herein, namely, an electromagnetic linear actuator, it is intended that the designation "linear actuator" be understood to include all other types of linear actuators including without limitation mechanical linear actuators (mechanical, wheel and axle, cam, etc.), hydraulic linear actuators, pneumatic linear actuators, piezoelectric linear actuators, and other electro-mechanical linear actuators. In addition, the function of the coil and the magnetic stator can be reversed such that movement of the magnetic stator controls rotation and movement of the coil controls the control arm.

It is to be understood that the foregoing description is intended to illustrate and not to limit the scope of the invention, which is defined by the appended claims. Other embodiments are within the scope of the following claims.

What is claimed is:

1. A rotary drive comprising:
  a support structure; and
  a linear actuator supported by the support structure, said linear actuator comprising:
    a first member;
    a second member that electromagnetically interacts with the first member when a drive signal is applied to the linear actuator, the electromagnetic interaction between the first and second members causing the second member to move in a linear direction relative to the first member; and
    a bearing arrangement supporting the first and second members within the support structure and enabling independent movement of the first member and the second member relative to the support structure;
said rotary drive further comprising:
a linear-to-rotary converter to which the second member of the linear actuator is coupled, said linear-to-rotary converter including an output member having a rotational axis, wherein during operation, the linear-to-rotary converter converts linear reciprocating movement of the second member of the linear actuator to rotary movement of the output member about the rotational axis.

2. The rotary drive of claim 1, wherein the first member is a magnetic stator assembly including one or more magnets generating magnetic fields, and wherein the second member is a coil assembly including a coil arranged to reciprocate within the magnetic fields generated by the magnetic stator assembly.

3. The rotary drive of claim 1, further comprising a control arm operated by movement of the first member of the linear actuator relative to the support structure.

4. The rotary drive of claim 1, further comprising:
a second support structure rigidly connected to the first-mentioned support structure; and
a second linear actuator supported by the second support structure, said second linear actuator comprising:
a first member;
a second member that moves in a linear direction relative to the first member of the second linear actuator when a drive signal is applied to the second linear actuator; and
a second bearing arrangement supporting the first and second members of the second linear actuator within the second support structure and enabling independent movement of the first and second members of the second linear actuator relative to the second support structure;
wherein the second member of the second linear actuator is coupled to the linear-to-rotary converter and wherein during operation, the linear-to-rotary converter converts linear reciprocating movement of the second member of the second linear actuator to rotary movement of the output member about the rotational axis; and
wherein the first member of the first-mentioned linear actuator is rigidly connected to the first member of the second linear actuator so that the first member of the first-mentioned linear actuator and the first member of the second linear actuator move together.

5. The rotary drive of claim 4, wherein the first-mentioned bearing arrangement comprises:
a first bearing assembly providing bearing surfaces between the first member of the first-mentioned linear actuator and the second member of the first-mentioned linear actuator and enabling movement of the first member of the first-mentioned linear actuator relative to the second member of the first-mentioned linear actuator; and
a second bearing assembly providing bearing surfaces between the first member of the first-mentioned linear actuator and the first-mentioned support structure and enabling movement of the first member of the first-mentioned linear actuator relative to the first-mentioned support structure.

6. The rotary drive of claim 5, wherein the second bearing arrangement comprises:
a first bearing assembly providing bearing surfaces between the first member of the second linear actuator and the second member of the second linear actuator and enabling movement of the first member of the second linear actuator relative to the second member of the second linear actuator; and
a second bearing assembly providing bearing surfaces between the first member of the second linear actuator and the second support structure and enabling movement of the first member of the second linear actuator relative to the second support structure.

7. The rotary drive of claim 4, wherein the first member of the first-mentioned linear actuator is a magnetic stator assembly including one or more magnets generating magnetic fields, and wherein the second member of the first-mentioned linear actuator is a coil assembly including a coil arranged to reciprocate within the magnetic fields generated by the magnetic stator assembly of the first-mentioned linear actuator.

8. The rotary drive of claim 7, wherein the first member of the second linear actuator is a magnetic stator assembly including one or more magnets generating magnetic fields, and wherein the second member of the second linear actuator is a coil assembly including a coil arranged to reciprocate within the magnetic fields generated by the magnetic stator assembly of the second linear actuator.

9. The rotary drive of claim 4, wherein the linear-to-rotary converter is configured to constrain motion of the second member of the first-mentioned linear actuator relative to the second member of the second linear actuator to be symmetric with respect to each other about a plane that is fixed with respect to the first and second support structures.

10. The rotary drive of claim 9, wherein the plane is perpendicular to the linear direction in which the second member of the first-mentioned linear actuator moves, and perpendicular to the linear direction in which the second member of the second linear actuator.

11. The rotary drive of claim 9, wherein the plane contains the rotational axis.

12. The rotary drive of claim 4, further comprising a control interface configured to receive a drive signal for the first-mentioned linear actuator and a drive signal for the second linear actuator, where differential mode drive signals applied to the linear actuators corresponds to reciprocating movement of the second member of the first-mentioned linear actuator and the second member of the second linear actuator, and common mode drive signals applied to the linear actuators corresponds to motion of the first member of the first-mentioned linear actuator and the first member of the second linear actuator relative to the first and second support structures.

13. The rotary drive of claim 1, wherein the output member comprises a rotor drive shaft.

14. The rotary drive of claim 13, further comprising a swashplate surrounding the rotary drive shaft.

15. The rotary drive of claim 14, further comprising a control arm operated by movement of the first member of the linear actuator relative to the support structure.

16. The rotary drive of claim 15, wherein the control arm is mechanically coupled to the support structure, and is configured to convert linear motion of the first member relative to the support structure into tilting of the swashplate.

17. The rotary drive of claim 13, further comprising rotor blades coupled to the rotor drive shaft, with the control arm configured to control cyclic pitches of the rotor blades.

18. The rotary drive of claim 1, wherein one of the first and second members comprises a coil.

19. A rotary drive comprising:
a support structure; and
a linear actuator supported by the support structure, said linear actuator comprising:
a magnetic stator assembly including one or more magnets generating magnetic fields;

a coil assembly including a coil arranged to reciprocate within the magnetic fields generated by the magnetic stator assembly, wherein the coil assembly moves in a linear direction relative to the magnetic stator assembly when a drive signal is applied to the coil; and a bearing arrangement supporting the magnetic stator assembly and the coil assembly within the support structure and enabling independent movement of the magnetic stator assembly and the coil assembly relative to the support structure;

said rotary drive further comprising:

a linear-to-rotary converter to which the coil assembly is coupled, said linear-to-rotary converter including an output member having a rotational axis, wherein during operation, the linear-to-rotary converter converts linear reciprocating movement of the coil assembly to rotary movement of the output member about the rotational axis.

* * * * *